March 29, 1927.
F. M. LYON
1,622,793
SAFETY KEY DEVICE
Filed Jan. 17, 1925
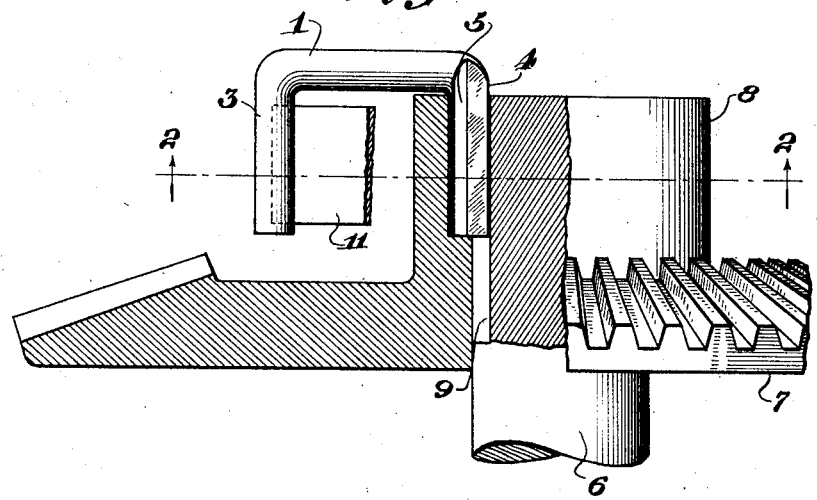
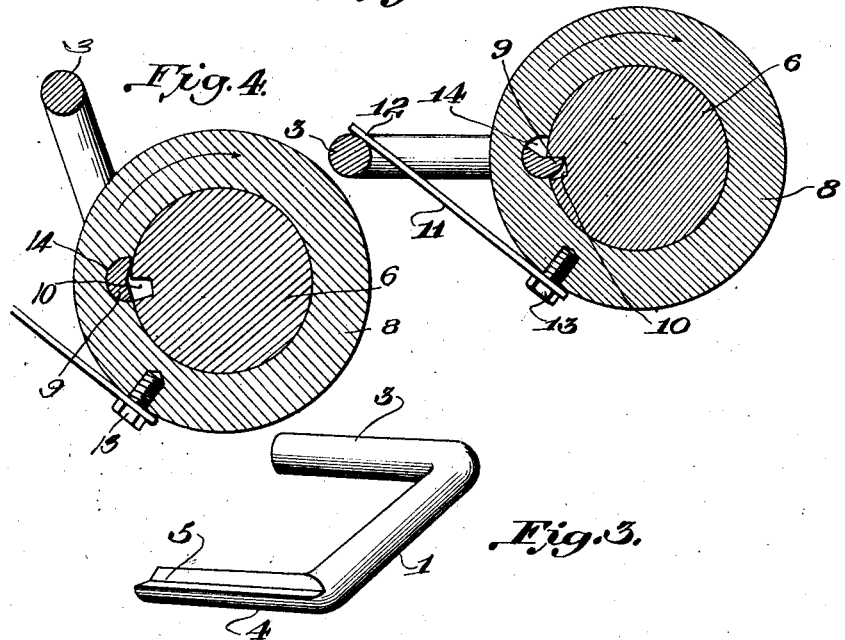
Inventor
Frederic M. Lyon.

Patented Mar. 29, 1927.

1,622,793

UNITED STATES PATENT OFFICE.

FREDERIC M. LYON, OF PONTIAC, ILLINOIS.

SAFETY KEY DEVICE.

Application filed January 17, 1925. Serial No. 3,138.

The prime object of this invention is to provide a safety key for preventing relative movement between two members at the exertion of a predetermined force.

Another object is to provide a device or a safety key for preventing relative movement between two members, that can be easily applied with little expense to any gear, pulley, or pinion and shaft.

A further object of this invention is to provide a very novel, but simple and inexpensive means as a protection against accident or breakage.

A further object is to provide a tension member, that may be easily replaced by one, adapted for release at any predetermined force.

Another object of this invention is to provide a means for the locking or interlocking of two members of a machine or device that are movable relatively, until the application of a certain predetermined amount of force, whereupon the locking means will automatically release, and permit the relative sliding movement of the members.

In the accompanying drawings illustrating embodiments of my invention—

Fig. 1 represents an elevation view of this invention showing the elements in assembled relation, partly in cross section.

Fig. 2 is a sectional view taken at 2—2 of Fig. 1.

Fig. 3 illustrates the safety key in perspective disclosing in particular the milled out angular portion.

Figure 4 illustrates the safety key device showing the different elements in the position occupied after the release due to an overload.

The numeral 1 represents the safety key, which may be made of drill rod or other suitable material, and bent or shaped into desired form depending on the device or machine to which the key is to be adapted. The safety key 1 may be shaped or bent at the ends, as at 3 and 4, one of the bent over portions 4, being milled out to a predetermined angle, as for instance 150°. The milled out or slotted portion is represented by the numeral 5.

The shaft 6 is adapted to carry loosely a gear, pulley, or pinion as at 7, having a hub 8. The shoulder portion 9 of the bent section 4 is adapted to extend in locking relation with the key way 10 of the shaft 6, while the remaining portion of the bent section 4 of the safety key 1 is carried in a circular slot 14 or other suitable groove located in the hub 8, the slot or groove 14 and key way 10, being, when normally in locked position, opposite to each other as shown in Fig. 2.

A flat tension spring 11 of suitable length is adapted to hold at one end as at 12 the safety key 1 under tension at an angle approximately perpendicular to the shaft 6, the other end of said spring being fastened to a suitable portion of the hub 8 as at 13 by a machine bolt 13 or otherwise.

In order to more clearly disclose this applicant's invention and its operation, the device is shown in Figure 4 with the parts in the position which they would take after the release of the key due to an overload.

In operation the tension spring 11 or other suitable device will hold the hub 8 and shaft 6 in locked or keyed relation as clearly disclosed in Fig. 2 until the exertion of a predetermined force, when the bent portion 3 of the key 1, or other suitable contact surface, will be released from contact with the spring at the point of applied tension as at 12, and the key portion 9 will be free to work loose from the keyway 10 of the shaft, thereby allowing the shaft 6 and hub 8 to run free from each other except for sliding relation, that is, the shaft will stop or cease to revolve, and the gear, or other suitable machine element will continue to revolve until the power is stopped.

The spring is designed strong enough to take the steady pull of a prime mover with a suitable reserve. Under excessive strain due to accident or otherwise, this spring will bend under the added pressure, as the key rod swings around, with the result that one side of the slot 5 coming toward the shaft will eventually leave the shaft free. The key is then adapted, to be lifted out, or otherwise; the gear or suitable machine element turned to the proper position and the key dropped in place again and adjusted to the tension spring ready for the next accident or excessive strain.

Many minor changes in detail of construction may be resorted to in order to adapt this invention to differet types of machine or devices without departure from the spirit, in any way, of this invention.

What I claim is:

1. The combination with a shaft, of a wheel turnably mounted on the shaft, and means for interlocking under tension the shaft and wheel, said means comprising a slotted U-shaped key member and a tension spring adapted to hold one leg of the U-shaped member under tension until the exertion of a predetermined force.

2. In combination, a shaft, an annular member mounted loosely thereon, a key for holding the shaft and member interlocked until a predetermined force is exerted therebetween, said key comprising a U-shaped member, one leg of which constitutes the key proper and in cross section is in the form of a sector of a circle, a spring secured to the annular member and extending to the other leg of the U-shaped member adapted to prevent the other leg from contacting with the annular member, the spring being adapted to flex under a given turning movement imparted to the key.

In testimony whereof I affix my signature.

FREDERIC M. LYON.